(12) United States Patent
Cuddihy et al.

(10) Patent No.: US 7,031,878 B2
(45) Date of Patent: Apr. 18, 2006

(54) SYSTEMS AND METHODS FOR DIAGNOSING THE CAUSE OF TREND SHIFTS IN PERFORMANCE DATA

(75) Inventors: Paul E. Cuddihy, Ballston Lake, NY (US); Daniel J. Cleary, Schenectady, NY (US); LiJie Yu, Clifton Park, NY (US)

(73) Assignee: General Electric Company, Niskayuna, NY (US)

( * ) Notice: Subject to any disclaimer, the term of this patent is extended or adjusted under 35 U.S.C. 154(b) by 641 days.

(21) Appl. No.: 10/320,173

(22) Filed: Dec. 16, 2002

(65) Prior Publication Data

US 2004/0117150 A1    Jun. 17, 2004

(51) Int. Cl.
*G06F 11/30* (2006.01)

(52) U.S. Cl. .................. 702/182; 702/183; 702/184; 701/100; 701/29

(58) Field of Classification Search ............ 702/182, 702/183, 184, 185; 701/100, 29, 30; 703/8
See application file for complete search history.

(56) References Cited

U.S. PATENT DOCUMENTS

| 5,951,611 | A  | * | 9/1999 | La Pierre | 701/29 |
| 6,591,182 | B1 | * | 7/2003 | Cece et al. | 701/100 |
| 2004/0088100 | A1 | * | 5/2004 | Volponi | 701/100 |

* cited by examiner

*Primary Examiner*—John Barlow
*Assistant Examiner*—Hien Vo
(74) *Attorney, Agent, or Firm*—Penny A. Clarke; Patrick K. Patnode

(57) ABSTRACT

Automated systems and methods for diagnosing the cause of a trend shift in performance data associated with a system including selecting a fuzzy model describing how the mean associated with a parameter shifts when a predetermined problem occurs and receiving performance data associated with the system. The diagnostic systems and methods also including applying a preferred set of piecewise regressions. The diagnostic systems and methods further including selecting a start date and selecting data sets near the start date and an end date that have a relatively large size without violating normal scatter. The diagnostic systems and methods still further including measuring the mean shift between a plurality of samples using one or more statistical tests and combining the results with the fuzzy model to achieve a diagnosis.

40 Claims, 4 Drawing Sheets

SYSTEMS AND METHODS FOR DIAGNOSING THE CAUSE OF TREND SHIFTS IN PERFORMANCE DATA

FIELD OF THE INVENTION

The present invention relates generally to automated statistical systems and methods. More specifically, the present invention relates to systems and methods for diagnosing the cause of trend shifts in performance data. In one exemplary embodiment, the present invention relates to systems and methods for diagnosing the cause of trend shifts in aircraft engine performance data.

BACKGROUND OF THE INVENTION

Typically, diagnosing the cause of trend shifts in performance data associated with mechanical systems, electrical systems, and electro-mechanical systems involves inconsistent, inefficient manual processes. Engineers and the like who use such diagnostic systems have to choose between data-driven systems and rule-based systems. Data-driven systems, also referred to herein as "case-based systems" or "experience-based systems," require the incorporation of a relatively large number of examples or validation cases before a given diagnostic system "learns" how to make an accurate diagnosis. Such diagnostic systems are prone to over-fitting data and making important decisions based on infrequent and/or irrelevant information. These diagnostic systems, however, are useful for diagnosing problems where examples or validation cases are plentiful and there is relatively little domain knowledge. In the aircraft engine domain, however, there is a relatively large amount of information related to how an aircraft engine works and why problems occur. Examples or validation cases, however, are not plentiful. In such a domain, experts typically prefer to write rules explaining what they hope to find and how to make diagnoses. These manually written rules suffer from the fact that they do not always match the examples or validation cases perfectly. Differences in the way symptoms are measured and the inability to predict the magnitude and/or speed of symptoms cause the rules to be imprecise, even if they are relatively easily interpreted and corrected by engineers or the like performing manual diagnoses. An automated diagnostic system performing such diagnoses, such as a computerized diagnostic system, has a relatively difficult time correcting the rules in real time.

Additionally, when multiple performance parameters are examined over time, rule-based systems, also referred to herein as "model-based systems," suffer from model uncertainty (related to the inability to determine how large of a trend shift to correlate to a given problem) and measurement uncertainty (related to the inability to determine the extent of the effect of noise on a given trend shift). Multiple performance parameters must, however, be considered in order to make an accurate diagnosis. Typically, these problems have been addressed via thresholding and the use of trend shift alerts. These trend shift alerts often utilize dimensionality that is too low to make an accurate diagnosis and, historically, rules are only corrected when they fail, i.e., they are not optimized.

Thus, what is needed are consistent, efficient systems and methods that allow for the analysis of performance data and the measurement of trends and trend shifts related to mechanical systems, electrical systems, and electro-mechanical systems. These systems and methods should allow the trend shifts to be compared to models built by experts and diagnose the cause of the trend shifts. What is also needed are systems and methods that allow engineers or the like to enter examples or validation cases against which the models may be evaluated and optimized. This would allow the engineers or the like to verify that the optimizations are appropriate and not over-fit.

BRIEF SUMMARY OF THE INVENTION

The systems and methods of the present invention allow an expert to enter one or more fuzzy functions related to one or more trend shifts into an automated diagnostic system. The automated diagnostic system then uses these rules to diagnose problems associated with a mechanical system, an electrical system, or an electro-mechanical system. A plurality of examples or validation cases are used to improve and refine the one or more fuzzy functions, optimizing the performance of the automated diagnostic system. Preferably, the improved fuzzy functions are presented to an engineer or the like for verification.

As an overview, the automated diagnostic systems and methods of the present invention allow an expert to build a plurality of fuzzy models describing how the mean of each of a plurality of performance parameters shifts for each of a plurality of predetermined problems. Outliers are removed using standard statistical techniques. The performance data is split by time in such a way as to allow linear or non-linear regressions to be run through each of a plurality of performance data segments with the lowest total residuals. The split points are evaluated to determine which are most likely to represent the beginning of a given problem. Data sets from the end of the performance data and around the best split point(s) are chosen such that each data set includes as many data points as possible without a standard deviation too far above that of the standard deviation of the linear regression residuals of the entire data window. T-tests or the like are then run on the data sets and rolled together with the fuzzy functions incorporated in the fuzzy models. Modeled problems that receive the highest scores are reported.

In one embodiment of the present invention, an automated method for diagnosing the cause of a trend shift in performance data associated with a system includes selecting a fuzzy model describing how the mean associated with a parameter shifts when a predetermined problem occurs and receiving performance data associated with the system. The diagnostic method also includes applying a preferred set of piecewise regressions. The diagnostic method further includes selecting a start date and selecting data sets near the start date and an end date that have a relatively large size without violating normal scatter. The diagnostic method still further includes measuring the mean shift between a plurality of samples using one or more statistical tests and combining the results with the fuzzy model to achieve a diagnosis.

In another embodiment of the present invention, an automated method for diagnosing the cause of a trend shift in performance data associated with an aircraft engine system includes selecting a fuzzy model describing how the mean associated with a parameter shifts when a predetermined problem occurs and achieving a diagnosis using the fuzzy model. The diagnostic method also includes providing a plurality of validation cases associated with the aircraft engine system and validating the fuzzy model using the plurality of validation cases. The diagnostic method further includes providing an evaluation function and using the evaluation function to determine how well the fuzzy model differentiates the diagnosis from a plurality of incorrect diagnoses for the plurality of validation cases.

In a further embodiment of the present invention, an automated system for diagnosing the cause of a trend shift in performance data associated with a system includes a fuzzy model describing how the mean associated with a parameter shifts when a predetermined problem occurs and means for receiving performance data associated with the system. The diagnostic system also includes a first algorithm operable for applying a preferred set of piecewise regressions. The diagnostic system further includes a second algorithm operable for selecting a start date and a third algorithm operable for selecting data sets near the start date and an end date that have a relatively large size without violating normal scatter. The diagnostic system still further includes a fourth algorithm operable for measuring the mean shift between a plurality of samples using one or more statistical tests and means for combining the results with the fuzzy model to achieve a diagnosis.

In a still further embodiment of the present invention, an automated system for diagnosing the cause of a trend shift in performance data associated with an aircraft engine system includes a fuzzy model describing how the mean associated with a parameter shifts when a predetermined problem occurs and means for achieving a diagnosis using the fuzzy model. The diagnostic system also includes means for receiving a plurality of validation cases associated with the aircraft engine system and means for validating the fuzzy model using the plurality of validation cases. The diagnostic system further includes an evaluation function, wherein the evaluation function is used to determine how well the fuzzy model differentiates the diagnosis from a plurality of incorrect diagnoses for the plurality of validation cases.

DETAILED DESCRIPTION OF THE INVENTION

Figure 1:
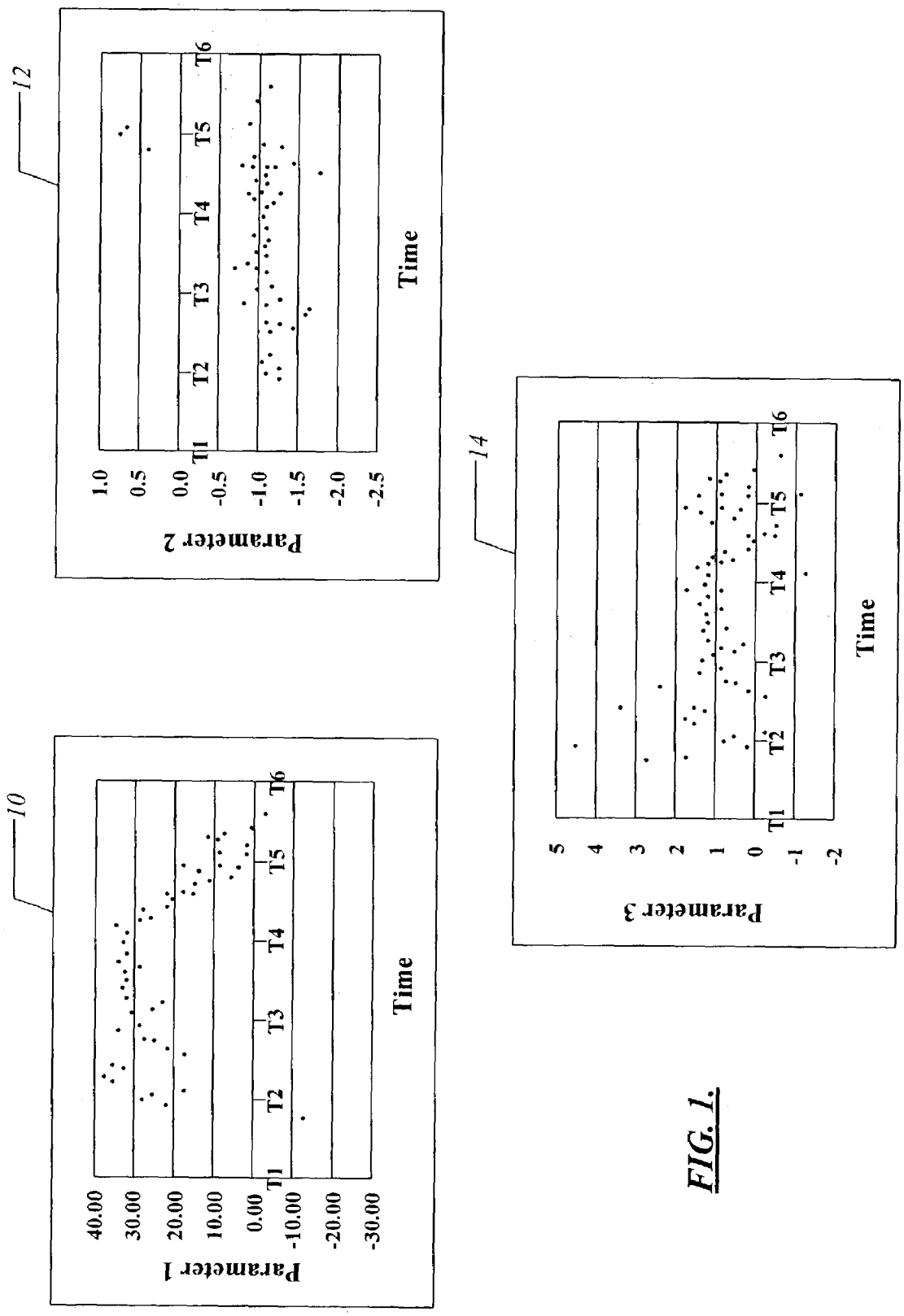
FIG. 1 is a series of plots illustrating a sample data set for three parameters collected over a period of several months and utilized by the diagnostic systems and methods of the present invention.

As an overview, the automated diagnostic systems and methods of the present invention allow an expert to build a plurality of fuzzy models describing how the mean of each of a plurality of performance parameters shifts for each of a plurality of predetermined problems. Outliers are removed using standard statistical techniques. The performance data is split by time in such a way as to allow linear or non-linear regressions to be run through each of a plurality of performance data segments with the lowest total residuals. The split points are evaluated to determine which are most likely to represent the beginning of a given problem. Data sets from the end of the performance data and around the best split point(s) are chosen such that each data set includes as many data points as possible without a standard deviation too far above that of the standard deviation of the linear regression residuals of the entire data window. T-tests or the like are then run on the data sets and rolled together with the fuzzy functions incorporated in the fuzzy models. Modeled problems that receive the highest scores are reported.

Advantageously, the models of the trend shifts mapped to each problem are relatively simple to understand and maintain and effectively capture the knowledge of the expert. T-tests or the like and fuzzy functions combine the uncertainty in the performance data and model more effectively than the human eye/brain. The diagnostic systems and methods of the present invention require little or no human interaction and may be delivered, for example, via the Internet.

In an extension of the present invention, genetic algorithms and six-sigma techniques are used to combine experience-based and rule-based diagnostics in order to enjoy the benefits of both, further increasing accuracy and decreasing maintenance requirements. An evaluation function is used to determine how well a given set of rules differentiates correct and incorrect diagnoses for a set of examples or validation cases. The output of the tool is a list of confidence values, 0 to 1, for each of a plurality of diagnoses. The confidence of the highest-ranked incorrect answer is subtracted from the confidence of the highest-ranked correct answer. If the diagnostic system works, this value is greater than 0. For a set of test cases, the results may be modeled statistically to predict how often the answer is correct and the average separation between correct and incorrect answers. As described above, each rule includes a set of fuzzy functions, which are typically described with four floating-point values specifying the upper and lower bounds of the correct response. There is a fuzzy function for each dimension of the rule. Predetermined fuzzy rules are changed randomly within established guidelines and the evaluation function is recalculated. Using known genetic algorithms, deviations that cause better results may be combined and reevaluated. Preferably, this process continues until no better solution may be found. These results are then validated by an engineer or the like in order to ensure that no over-fitting has occurred.

It should be noted that the diagnostic systems and methods of the present invention are described herein, by way of example only, in conjunction with an aircraft engine system. The diagnostic systems and methods of the present invention may, however, be used in conjunction with any mechanical, electrical, or electro-mechanical system. Further, application to biological systems or the like is also possible.

In one embodiment, the diagnostic system of the present invention is designed to measure trend shifts in a plurality of performance parameters, parameter 1, parameter 2, . . . , and parameter n. In the aircraft engine domain, these performance parameters may include, for example, exhaust gas temperature—hot day margin (degrees C.), change in exhaust gas temperature (degrees C.), fuel flow (percentage), core speed (percentage), etc. The performance parameters are snapshots taken during respective flight phases (during takeoff, cruise, etc.) and are preferably corrected to standard operating conditions, reducing noise in the performance data. Steady trends in these performance parameters typically reflect healthy engine operation. Changes or abrupt shifts in the trends typically indicate a problem or required maintenance action. FIG. 1 illustrates a sample data set for three parameters, parameter 1 10, parameter 2 12, and parameter 3 14, collected over a period of several months.

Figure 2:
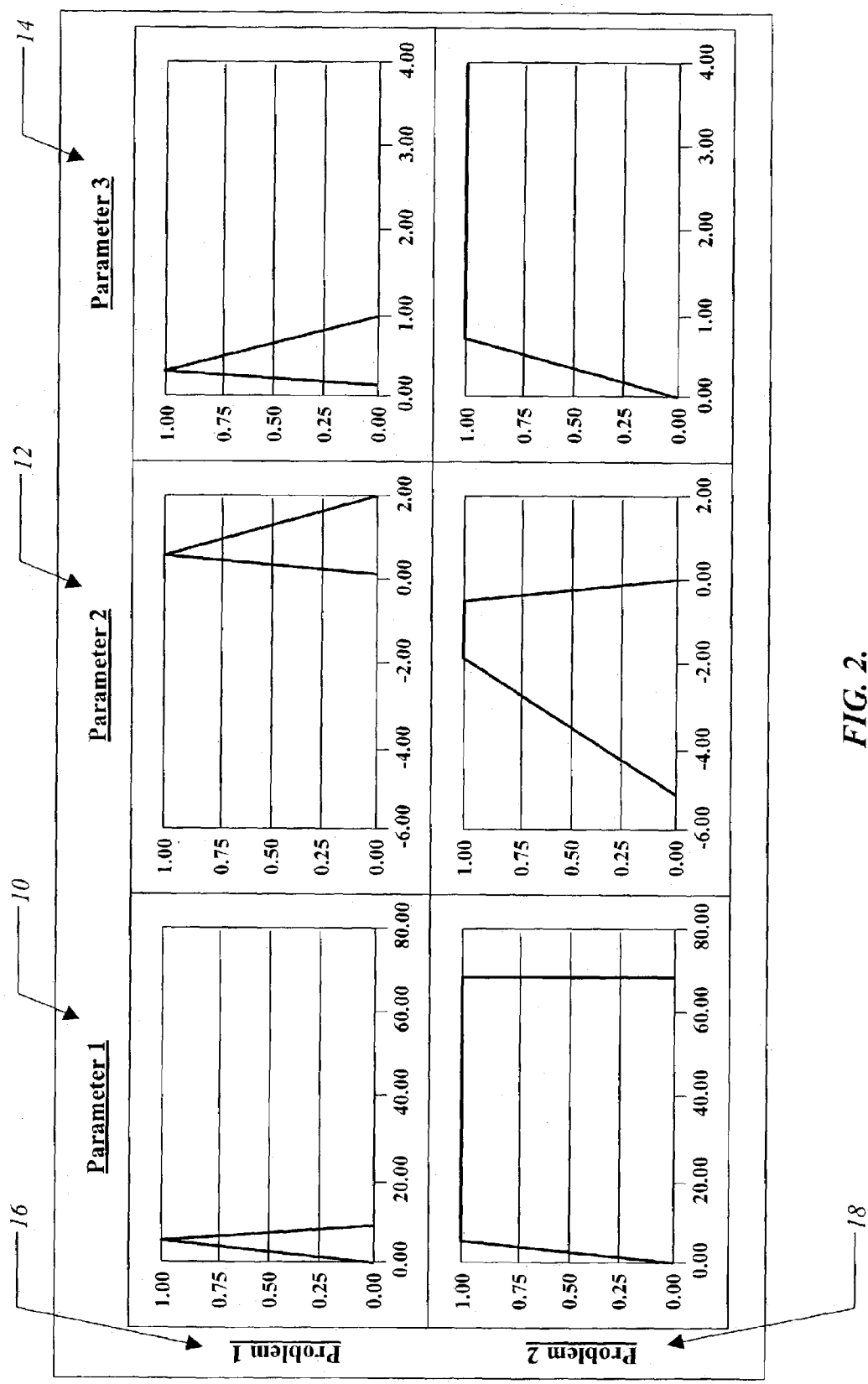
FIG. 2 is a series of plots illustrating how two rules associated with the diagnostic systems and methods of the present invention function.

Diagnoses are made based upon trend shifts. Trends in three or four parameters up or down yield several dozen rules ($2^4$=16, $3^4$=81 for up/down/no change). Each diagnosis is associated with a signature shift for each performance parameter being measured. For a rule to match, measured shifts must match the signature shift for each performance parameter. FIG. 2 illustrates how two rules associated with the diagnostic systems and methods of the present invention function. The first rule 16 looks for about 5 degrees shift related to parameter 1 10, about 1.0% shift related to parameter 2 12, and about 0.5% shift related to parameter 3 14. The second rule 18 looks for about 7 degrees shift up related to parameter 1 10, about 0.5% to about 2.0% shift down related to parameter 2 12, and about 0.5% shift up related to parameter 3 14. In FIG. 2, the horizontal axes represent the amount of parameter shift and the vertical axes represent the confidence of the corresponding diagnoses. In addition to shift amounts, the diagnostic systems and methods of the present invention use the duration of the shift as an extra parameter that behaves differently from the other parameters. Identical shifts may be differentiated based on the period of time over which they occur.

Advantageously, the diagnostic systems and methods of the present invention act independently of a fixed window in which shifts are measured. The diagnostic systems and methods determine the start date of the most recent shift, as measured across all parameters, and measure shifts only during that period. The diagnostic systems and methods of the present invention also incorporate one or more algorithms that combine noise in the input data (as measured using a t-test statistic) with the noise in the model (as represented by the fuzzy functions). This allows for the accurate ranking of possible diagnoses.

Figure 3:
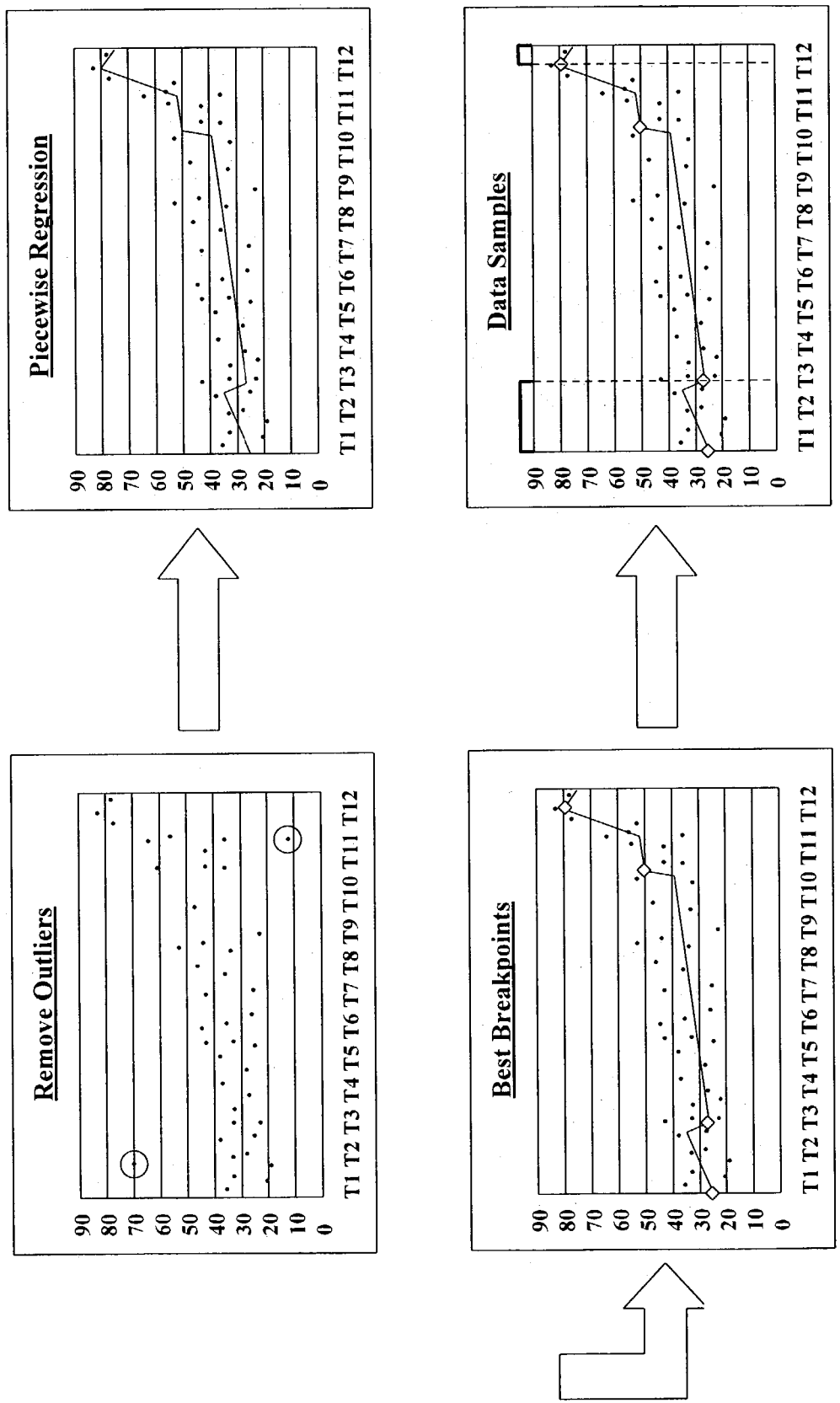
FIG. 3 is a series of plots illustrating several measurement steps associated with the diagnostic systems and methods of the present invention.

As described above, the diagnostic systems and methods of the present invention incorporate the following measurement steps, several of which are illustrated in FIG. 3:

Remove outliers by calculating a local standard deviation minus the point in question and removing the point in question if it falls outside of a specified z;

Find the best set of piecewise linear or non-linear regressions, following the presumption that deterioration is linear but changes abruptly due to events;

After fitting regression lines, the corner points (across all parameters) are the candidate start dates;

Pick the start date that provides the largest shift (weighted across all parameters) without leveling out or changing direction between start dates and end dates;

Find the local standard deviations representing normal scatter;

Pick data sets near the start date and end date that are as large as possible without violating normal scatter;

Use two sample t-tests to measure the mean shift between samples;

Combine these results with the fuzzy models to achieve a diagnosis.

Because the engineer or the like may specify any time period for analysis, and there may be more than one significant event during that time period, only the most recent shift is analyzed. Looking from the most recent data backwards until the trends flatten or reverse direction accomplishes this. The point where the flattening or reversal occurs is considered the start date and earlier data is ignored. Data sets are defined around the start date and the current date, and their means are compared using two sample t-tests. This reduces inconsistency and the manual estimation typically associated with trend shift measurement.

The output of the diagnostic systems and methods of the present invention consists of an ordered list of rule matches. A complete list of rules is presented as several of the most likely diagnoses should be considered and it is useful to consider which diagnoses are least likely.

The noise filtering or outlier removal associated with the diagnostic systems and methods of the present invention should be appropriate for the domain involved and may consist of, for example, a two-pass process or the like as is well known to those of ordinary skill in the art.

Once outliers are removed, a piecewise linear regression algorithm is applied to the data for each parameter. Alternatively, a non-linear regression algorithm may be applied, where appropriate. For every point except for the points at the beginning and end of the sample, one regression is fitted for all earlier data and another regression is fitted for all later data. The error is squared and recorded. The splitting point producing the lowest error is retained. This process is applied to each side recursively to each sub-section as long as it still has a predetermined number of points in it and covers at least predetermined number of days (or years, months, weeks, hours, minutes, seconds, etc.). In order to catch newly developing shifts, the final line segment is split one additional time.

For evaluating possible start dates and measuring shifts, a consistent method for selecting data samples is utilized. A short-term standard deviation is calculated for the data. This involves calculating the distance of each point from the regression line and calculating the standard deviation of all of these values. The result represents the standard deviation of the short-term noise. To select a data set representing a potential start date, data points before the target point are evaluated, starting with a minimum data set size. The data set is expanded backwards as long as its standard deviation does not exceed a predetermined maximum noise ratio times the short-term noise standard deviation and the data set size does not exceed a maximum set. The maximum set size for a particular aircraft engine or the like depends on the number of points received per time period. The function attempts to get a predetermined number of points, but makes adjustments as necessary to keep the maximum between two potential numbers of total points. The result is a data set large enough that is has scatter representative of the complete data set, but small enough to minimize the apparent scatter caused by trend shifts.

Picking the best shift start date involves screening potential start dates generated by each parameter to retain only those that fall in the most recent shift. This is accomplished by moving from the most recent date backwards and discarding dates until the shift amount divided by the duration is at least equal to the parameter's normalizer divided by a predetermined amount. Shifts are measured with the data set-finding algorithm described above.

Once a shift is established, start dates are considered viable candidates as long as the shift amount in each new segment is at least a predetermined fraction of the shift found so far and it moves in the same direction. If the shift has leveled off or reversed, then no additional start date candidates are considered from this parameter. For each remaining start date candidate, the sum of the shifts of each parameter normalized by the respective normalizer is calculated. A second pass is made by starting with the latest candidate and moving backwards until the next date fails to contribute at least a predetermined fraction more combined shift than has been totaled thus far. The result is a start date of the most recent significant trend shift.

The automated diagnostic systems and methods of the present invention store each fuzzy rule as a set of, for example, 4 X values. These values represent the X's in increasing order where Y is [0,1,1,0]. Referring to Table 1, the diagnosis 4 rule expects a parameter 1 shift of between −3 and −1. Values between −10 and 0 are considered partial matches.

TABLE 1

Exemplary Set of Fuzzy Rules Associated With Parameter 1

| Diagnosis Rule | Parameter 1 | | | |
|---|---|---|---|---|
| | Fuz 0 | Fuz 1 | Fuz 1' | Fuz 0' |
| Diagnosis 1 Rule | 0.00 | 4.00 | 4.00 | 8.00 |
| Diagnosis 2 Rule | 2.00 | 11.00 | 100.00 | 100.00 |
| Diagnosis 3 Rule | 2.00 | 11.00 | 100.00 | 100.00 |
| Diagnosis 4 Rule | −10.00 | −3.00 | −1.00 | 0.00 |
| Diagnosis 5 Rule | 2.00 | 6.00 | 6.00 | 40.00 |

Functions are not evaluated against a point shift estimation, but rather against the entire confidence band of the shift calculation. Thus, a triangle function such as [5,10,10,15]—which represents the desire to match a shift of 10 degrees—may never evaluate to 1.0 unless there is no scatter in the data. Preferably, the fuzzy functions have plateaus that cover a reasonable noise band.

It should also be noted that some of the functions may be built with arbitrarily large values on one end of the function, such as [0,15,100,100]. This is meant to cover any shift above 15 degrees (again, due to noise, the function will not evaluate to 1.0 until the shift is greater than 15 degrees). Preferably, these large values are large, enough to fall beyond the 99% confidence band of the largest shift. Further, using the same large constant consistently for each parameter provides clarity.

Figure 4:
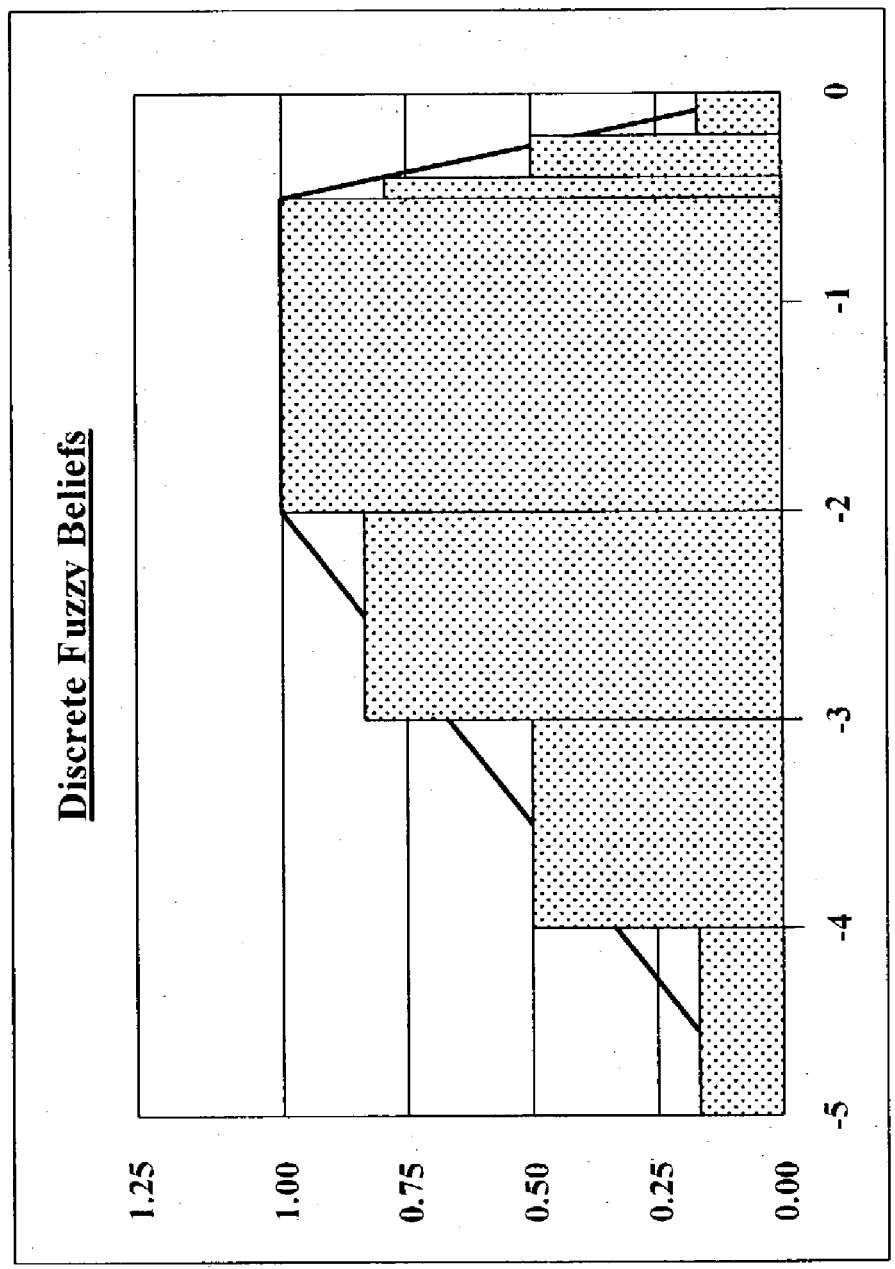
FIG. 4 is a graph illustrating a method for evaluating a fuzzy function associated with the diagnostic systems and methods of the present invention.

Each individual fuzzy function represents an expected mean shift. Given two data sets, a function is evaluated by simplifying the slopes into step functions, using two-sample t-tests or the like to evaluate the probability for each step, and summing the results. This is akin to integration and is illustrated in FIG. 4. FIG. 4 indicates, based on the fuzzy function represented, that an engineer or the like was looking for a mean shift of between about −0.5 and −2.0, but was willing to accept some match between about 0 and −5.0. The fuzzy function is represented as a step function. Each area is assigned a multiplier equal to the average value of the fuzzy function over its range. A two-sample t-test or the like is performed over the range of each area. The final probability is the sum of the t-test results times the multiplier for each step.

$$\text{prob} = \text{sum}(1,n)(\text{ttest}(\text{sample1}, \text{sample2}, n_{low}, n_{high})^* \\ (\text{fuzzy}(n_{low}) + \text{fuzzy}(n_{high}))/2. \quad (1)$$

Higher values for n provide more accurate results. For example, n may have a value of 5. The plateaus may be evaluated and the slopes split into two pieces each.

For enhanced performance, the entire area where the fuzzy function evaluates to 1.0 is preferably taken as a step. The number of t-tests performed may also be reduced by half by evaluating, for example, the entire range where the function evaluates to 0.83, then subtracting the previous t-test where the function evaluated to 1.0. Because the sum of the t-test results over the range from negative infinity to positive infinity must, by definition, add to 1.0 and all multipliers are less than 1.0, the final answer must be a value between 0 and 1.0. This value represents the degree to which the mean shift falls in the range specified by the fuzzy function.

Scores for each individual rule are computed as described above. A score for duration is calculated by simply mapping the duration (end date minus start date) to the duration fuzzy function. Because there is no confidence interval around duration, the computation is straightforward. The scores are combined with a geometric average:

$$P = [f(\text{param}_1)^* f(\text{param}_2) \ldots, f(\text{param}_{n-1})^* f(\text{duration})]^{1/N}. \quad (2)$$

It should be noted that N changes when parameters are missing.

A verification display may be made available to the engineer or the like in the form of a rule screen showing the best matching rules. The display may show all of the parameters associated with a given rule in one row. For each parameter, the fuzzy function is displayed, representing the "expected" mean shift. The calculated mean shift is also displayed, with 95% confidence bands. Preferably, the match value is also shown below each parameter.

It is apparent that systems and methods for diagnosing the cause trend shifts in performance data have been shown and described herein. Although the present invention has been shown and described with reference to preferred embodiments and examples thereof, it will be readily apparent to those of ordinary skill in the art that other embodiments and examples may perform similar functions and/or achieve similar results. For example, although mean shifts are measured and utilized herein, scatter shifts (amount and/or shape), the ratios of trend shifts, and/or the like may also be measured and utilized. Statistical techniques other than those specifically described may also be utilized. All such equivalent embodiments and examples are within the scope and spirit of the present invention and are intended to be covered by the following claims.

What is claimed is:

1. An automated method for diagnosing the cause of a trend shift in performance data associated with a system, the method comprising:
   selecting a fuzzy model describing how the mean associated with a parameter shifts when a predetermined problem occurs;
   receiving performance data associated with the system;
   applying a preferred set of piecewise regressions;
   selecting a start date;
   selecting data sets near the start date and an end date that have a predetermined size without violating normal scatter;
   measuring the mean shift between a plurality of samples using one or more statistical tests; and
   combining the results with the fuzzy model to achieve a diagnosis.

2. The diagnostic method of claim 1, further comprising removing outlying data points from the performance data by calculating a local standard deviation minus a data point in question and removing the data point if the data point falls outside of a predetermined range.

3. The diagnostic method of claim 1, wherein the start date provides a relatively large shift without leveling or changing direction between the start date and an end date.

4. The diagnostic method of claim 1, wherein the one or more statistical tests comprise a two-sample t-test.

5. The diagnostic method of claim 1, further comprising providing a plurality of validation cases associated with the system.

6. The diagnostic method of claim 5, further comprising validating the fuzzy model using the plurality of validation cases.

7. The diagnostic method of claim 5, further comprising providing an evaluation function.

8. The diagnostic method of claim 7, further comprising using the evaluation function to determine how well the fuzzy model differentiates the diagnosis from a plurality of incorrect diagnoses for the plurality of validation cases.

9. The diagnostic method of claim 8, wherein using the evaluation function to determine how well the fuzzy model differentiates the diagnosis from the plurality of incorrect diagnoses for the plurality of validation cases comprises outputting a plurality of confidence values for the diagnosis and the plurality of incorrect diagnoses.

10. The diagnostic method of claim 9, further comprising determining the degree of separation between the diagnosis and the plurality of incorrect diagnoses.

11. The diagnostic method of claim 10, further comprising optimizing the degree of separation between the diagnosis and the plurality of incorrect diagnoses by randomly varying the fuzzy model within predetermined guidelines and recalculating the evaluation function.

12. The diagnostic method of claim 11, further comprising combining and evaluating deviations that exhibit favorable diagnostic performance using a genetic algorithm.

13. The diagnostic method of claim 12, further comprising validating the fuzzy model to ensure that no over-fitting of the plurality of validation cases has occurred.

14. The diagnostic method of claim 1, wherein the system comprises an aircraft engine system.

15. An automated method for diagnosing the cause of a trend shift in performance data associated with an aircraft engine system, the method comprising:
    selecting a fuzzy model describing how the mean associated with a parameter shifts when a predetermined problem occurs;
    achieving a diagnosis using the fuzzy model;
    providing a plurality of validation cases associated with the aircraft engine system;
    validating the fuzzy model using the plurality of validation cases;
    providing an evaluation function; and
    using the evaluation function to determine how well the fuzzy model differentiates the diagnosis from a plurality of incorrect diagnoses for the plurality of validation cases.

16. The diagnostic method of claim 15, wherein using the evaluation function to determine how well the fuzzy model differentiates the diagnosis from the plurality of incorrect diagnoses for the plurality of validation cases comprises outputting a plurality of confidence values for the diagnosis and the plurality of incorrect diagnoses.

17. The diagnostic method of claim 16, further comprising determining the degree of separation between the diagnosis and the plurality of incorrect diagnoses.

18. The diagnostic method of claim 17, further comprising optimizing the degree of separation between the diagnosis and the plurality of incorrect diagnoses by randomly varying the fuzzy model within predetermined guidelines and recalculating the evaluation function.

19. The diagnostic method of claim 18, further comprising combining and evaluating deviations that exhibit favorable diagnostic performance using a genetic algorithm.

20. The diagnostic method of claim 19, further comprising validating the fuzzy model to ensure that no over-fitting of the plurality of validation cases has occurred.

21. An automated system for diagnosing the cause of a trend shift in performance data associated with a system, the diagnostic system comprising:
    a fuzzy model describing how the mean associated with a parameter shifts when a predetermined problem occurs;
    means for receiving performance data associated with the system;
    a first algorithm operable for applying a preferred set of piecewise regressions;
    a second algorithm operable for selecting a start date;
    a third algorithm operable for selecting data sets near the start date and an end date that have a predetermined size without violating normal scatter;
    a fourth algorithm operable for measuring the mean shift between a plurality of samples using one or more statistical tests; and
    means for combining the results with the fuzzy model to achieve a diagnosis.

22. The diagnostic system of claim 21, further comprising a fifth algorithm operable for removing outlying data points from the performance data by calculating a local standard deviation minus a data point in question and removing the data point if the data point falls outside of a predetermined range.

23. The diagnostic system of claim 21, wherein the start date provides a relatively large shift without leveling or changing direction between the start date and an end date.

24. The diagnostic system of claim 21, wherein the one or more statistical tests comprise a two-sample t-test.

25. The diagnostic system of claim 21, further comprising means for receiving a plurality of validation cases associated with the system.

26. The diagnostic system of claim 25, further comprising means for validating the fuzzy model using the plurality of validation cases.

27. The diagnostic system of claim 25, further comprising an evaluation function.

28. The diagnostic system of claim 27, wherein the evaluation function is used to determine how well the fuzzy model differentiates the diagnosis from a plurality of incorrect diagnoses for the plurality of validation cases.

29. The diagnostic system of claim 28, wherein the evaluation function is used to determine how well the fuzzy model differentiates the diagnosis from the plurality of incorrect diagnoses for the plurality of validation cases by outputting a plurality of confidence values for the diagnosis and the plurality of incorrect diagnoses.

30. The diagnostic system of claim 29, further comprising means for determining the degree of separation between the diagnosis and the plurality of incorrect diagnoses.

31. The diagnostic system of claim 30, further comprising a sixth algorithm operable for optimizing the degree of separation between the diagnosis and the plurality of incorrect diagnoses by randomly varying the fuzzy model within predetermined guidelines and recalculating the evaluation function.

32. The diagnostic system of claim 31, further comprising a genetic algorithm operable for combining and evaluating deviations that exhibit favorable diagnostic performance.

33. The diagnostic system of claim 32, further comprising means for validating the fuzzy model to ensure that no over-fitting of the plurality of validation cases has occurred.

34. The diagnostic system of claim 21, wherein the system comprises an aircraft engine system.

35. An automated system for diagnosing the cause of a trend shift in performance data associated with an aircraft engine system, the diagnostic system comprising:
- a fuzzy model describing how the mean associated with a parameter shifts when a predetermined problem occurs;
- means for achieving a diagnosis using the fuzzy model;
- means for receiving a plurality of validation cases associated with the aircraft engine system;
- means for validating the fuzzy model using the plurality of validation cases; and
- an evaluation function, wherein the evaluation function is used to determine how well the fuzzy model differentiates the diagnosis from a plurality of incorrect diagnoses for the plurality of validation cases.

36. The diagnostic system of claim 35, wherein the evaluation function is used to determine how well the fuzzy model differentiates the diagnosis from the plurality of incorrect diagnoses for the plurality of validation cases by outputting a plurality of confidence values for the diagnosis and the plurality of incorrect diagnoses.

37. The diagnostic system of claim 36, further comprising means for determining the degree of separation between the diagnosis and the plurality of incorrect diagnoses.

38. The diagnostic system of claim 37, further comprising an algorithm operable for optimizing the degree of separation between the diagnosis and the plurality of incorrect diagnoses by randomly varying the fuzzy model within predetermined guidelines and recalculating the evaluation function.

39. The diagnostic system of claim 38, further comprising a genetic algorithm operable for combining and evaluating deviations that exhibit favorable diagnostic performance.

40. The diagnostic system of claim 39, further comprising means for validating the fuzzy model to ensure that no over-fitting of the plurality of validation cases has occurred.

* * * * *